Nov. 15, 1955 W. F. DOUBLE ET AL 2,723,567
TRANSMISSION CONTROL ZIGZAG TYPE
Filed April 28, 1954 6 Sheets-Sheet 1

FIG 1

INVENTORS.
WALTER F. DOUBLE
HAROLD C. SCHINDLER
RAYMOND Q. ARMINGTON
BY
Hyde, Myer, Baldwin & Doran
ATTORNEYS

W. F. DOUBLE ET AL 2,723,567

TRANSMISSION CONTROL ZIGZAG TYPE

Filed April 28, 1954

INVENTORS.
WALTER F. DOUBLE
HAROLD C. SCHINDLER
RAYMOND Q ARMINGTON
BY
ATTORNEYS

_United States Patent Office_

2,723,567
Patented Nov. 15, 1955

2,723,567
TRANSMISSION CONTROL ZIGZAG TYPE

Walter F. Double, Wickliffe, Harold C. Schindler, Shaker Heights, and Raymond Q. Armington, Euclid, Ohio, assignors to General Motors Corporation, Detroit, Mich., a corporation of Delaware Application April 28, 1954, Serial No. 426,114

11 Claims. (Cl. 74—365)

This invention relates to a transmission control and more particularly to one utilized in connection with a ladder-type transmission.

The term "ladder-type transmission" is herein applied to that type of transmission wherein two separate clutches are selectively engageable with transmission gearing arranged in such a fashion that while the vehicle is driving, say in first gear utilizing engagement of a first clutch, a second gear may be pre-selected, after which the second clutch is engaged and the first clutch no longer drives the vehicle but the vehicle is driven through the second clutch in second gear. Reversely, it is possible while in second gear utilizing the second clutch for driving, to pre-select first gear, after which the first clutch is engaged and so the transmission is operated in a downward direction.

It is an object of the present invention, therefore, to arrange a simplified transmission control for use with a ladder-type transmission wherein, when the transmission is set for a given speed gear, the operator may pre-select either the gear lower or the gear higher.

Another object of the present invention is to provide a gear transmission as defined in the preceding paragraph but wherein when the transmission is set for a given gear, the same gear in reverse may be pre-selected.

Another object of the present invention is to provide a novel control tower for a transmission of the type described above wherein all of the parts necessary for the operation of the transmission control may be compactly assembled.

A still further object of the present invention is to provide novel mechanisms and actuators for carrying out the purpose of our invention.

Other objects and advantages of the present invention will be apparent from the accompanying drawings and description and the essential features will be set forth in the appended claims.

In the drawings,

Fig. 10 is a fragmental view of the reverse locking latch of Fig. 9 in reverse-maintaining position; while

The present invention will be disclosed as applied to a ladder-type transmission of Martin P. Winther, disclosed and claimed in his co-pending United States patent application Serial No. 272,375, filed February 19, 1952. This transmission provides eight speeds forward and eight speeds reverse.

Figure 1:
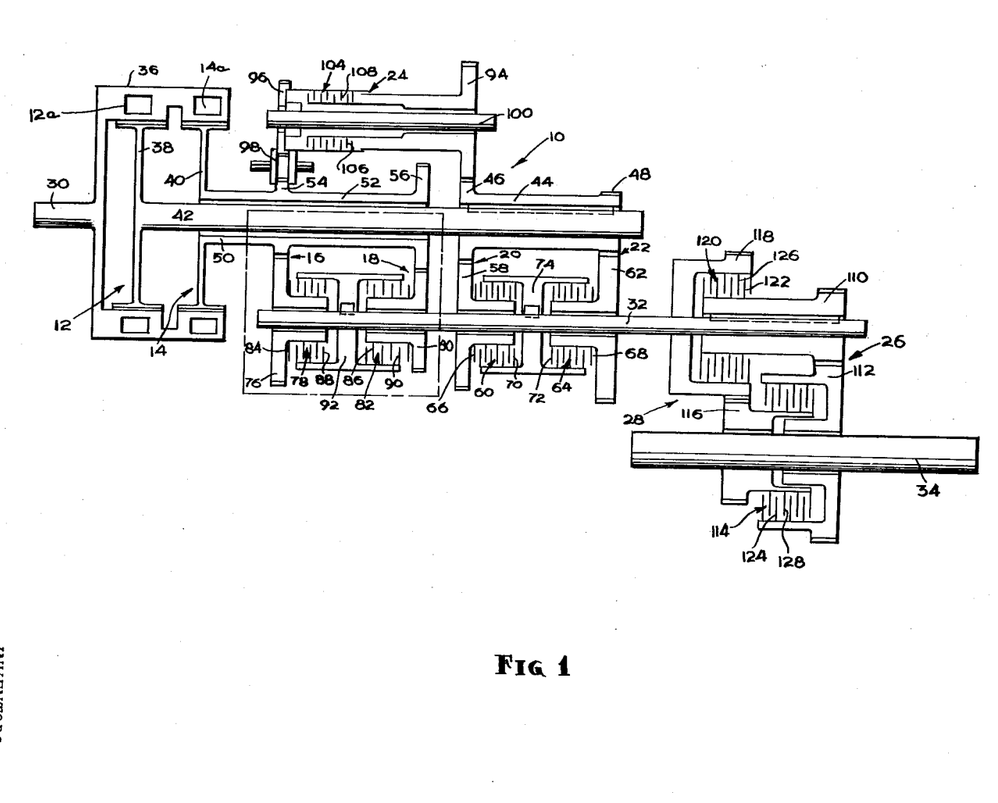
Fig. 1 is a diagrammatic view showing a ladder-type transmission which our improved control is adapted to operate and wherein there are provided eight speeds forward and eight speeds reverse.

Referring to Fig. 1 of the drawings for more specific details of the aforesaid invention of Martin P. Winther, 10 represents generally a multiple forward and reverse speed transmission comprising basically a pair of main power input clutches 12 and 14, gear sets 16, 18, 20 and 22, reverse gear cluster 24, auxiliary gear sets 26 and 28, and input, intermediate and output shafts 30, 32 and 34 respectively.

Input shaft 30 has affixed thereto a drum member 36 constituting an input or driving member of both clutches 12 and 14.

Clutches 12 and 14 are preferably of the eddy current electromagnetic type and comprise in addition to the input member 36, rotor or output members 38 and 40 respectively. Output member 38 includes an output shaft 42 having a gear cluster 44 fixedly secured thereon, comprising axially spaced gears 46 and 48 whereas output member 40 includes a quill shaft 50, encircling shaft 42, having a gear cluster 52 thereon, comprising axially spaced gears 54 and 56.

Gear 46 constituting a part of gear set 20 meshes with a gear 58, forming the other part thereof, and gear 58 is in turn adapted to be coupled to intermediate shaft 32 by way of a friction clutch 60. Gear 48, of gear cluster 44, constituting a part of gear set 22 meshes with a gear 62, forming the other part thereof, and gear 62 is in turn adapted to be coupled to intermediate shaft 32 by way of a friction clutch 64. Both clutches 60 and 64 as shown are of the multiple plate type and include respectively input plates 66 and 68 connected to the respective gears 58 and 62, and output plates 70 and 72 respectively connected to a common support 74 having keyed relation with intermediate shaft 32.

Gear 54 constituting a part of gear set 16, meshes with a gear 76, forming the other part thereof, and gear 76 is in turn adapted to be coupled to intermediate shaft 32 by way of a friction clutch 78. Gear 56, of gear cluster 52, constituting a part of gear set 18, meshes with a gear 80, forming the other part thereof, and gear 80 is in turn adapted to be coupled to intermediate shaft 32 by way of a friction clutch 82. Both clutches 78 and 82 are identical to clutches 62 and 62 and include input plates 84 and 86 connected to the respective gears 76 and 80, and output plates 88 and 90 respectively connected to a common support 92 having keyed relation with intermediate shaft 32.

Reverse gear cluster 24 includes a gear 94 having meshing relation with gear 46 and gear 96 having meshing relation with a reverse idler gear 98, said idler gear in turn meshing with gear 54 of gear cluster 52. Gears 94 and 96 are supported for rotation on jack shaft 100 and are adapted to be coupled together by a friction clutch 104. The clutch 104 includes engageable plates 106 and 108 connected respectively to the gears 94 and 96.

Auxiliary gear sets 26 and 28 as combined constitute an auxiliary gear box for transmission 10. Gear 110 constituting a part of gear set 26 is keyed to intermediate shaft 32 and has meshing engagement with a gear 112 forming the other part of gear set 26 and gear 112 is in turn adapted to be coupled by way of a friction clutch 114 to a gear 116 keyed to output shaft 34. Gear 116, constituting a part of gear set 28 meshes with a gear 118 forming the other part of gear set 28, and gear 118 is in turn adapted to be coupled to gear 110 by way of a friction clutch 120. Clutches 114 and 120 are of the multiple plate type and include input plates 122 and 124 connected respectively to gears 110 and 112 and output plates 126 and 128 connected respectively to gears 118 and 116.

Friction clutches 60, 64, 78, 82, 104, 114 and 120 can be actuated by any of several conventional means, such as hydraulically, vacuum, or electricity; hydraulic operation under electrical control being hereinafter described.

For the purpose of achieving eight forward as well as eight reverse speeds the gears are required to be predetermined as to size for example wherein meshing gears 54 and 76 are provided with 26 and 46 teeth respectively, meshing gears 56 and 80 are provided with 39 and 33 teeth respectively, meshing gears 46 and 58 are provided with 32 and 40 teeth respectively, meshing gears 48 and 62 are provided with 20 and 52 teeth respectively, meshing gears 110 and 112 are provided with 24 and 79 teeth respectively, meshing gears 118 and 116 are provided with 59 and 44 teeth respectively, reverse gear 96 is provided with 32 teeth and reverse gear 94 is provided with 40 teeth.

The first forward speed of the transmission is obtained through an energization of clutch 12, engagement of clutch 64 and engagement of clutch 114 such that power flows by way of clutch 12, output member 38, shaft 42, gear cluster 44, meshing gears 48 and 62, engageable plates 66 and 72 of clutch 64, member 74, shaft 32, meshing gears 110 and 112, engageable plates 124 and 128 of clutch 114, gear 116 and output shaft 34. Second forward speed is next obtained by de-energizing clutch 12, simultaneously energizing clutch 14, disengaging clutch 64, simultaneously engaging clutch 78, and maintaining clutch 114 engaged whereby power flows from clutch 14 output member 40, shaft 50, gear cluster 52, meshing gears 54 and 76, clutch 78, shaft 32, meshing gears 110 and 112, clutch 114, and shaft 34.

A third forward speed is achieved upon the de-energization of clutch 14, simultaneous energization of clutch 12, disengagement of clutch 78, simultaneous engagement of clutch 60 and maintenance of clutch 114 engaged whereby power flows by way of clutch 12, output member 38, shaft 42, gear cluster 44, meshing gears 46 and 58, clutch 60, shaft 32, meshing gears 110 and 112, clutch 114, gear 116 and shaft 34.

Fourth speed of operation of the transmission is obtained by de-energizing clutch 12, simultaneously energizing clutch 82, and maintaining clutch 114 engaged whereby power flows by way of clutch 14, output member 40, shaft 50, gear cluster 52, meshing gears 56 and 80, clutch 82, shaft 32, meshing gears 110 and 112, clutch 114, gear 116 and shaft 34.

It is to be noted that throughout the first four forward speeds of operation of the transmission that the gear ratio of the auxiliary gear box has remained constant and it is thus only necessary to disengage clutch 114 and simultaneously engage clutch 120 in the auxiliary gear box to obtain forward speeds five through eight of the transmission wherein the same sequence of operation of clutches 12 and 14, and clutches 64, 78, 60 and 82 is had in connection therewith as occurred for speeds one through four.

During all eight forward speeds of operation of the transmission the clutch 104 is disengaged and it is not until a reverse drive is desired that said clutch is engaged. With clutch 104 engaged and by reason of idler gear 98 in meshing relation between gears 96 and 54 a reverse rotation is imparted, by way of the appropriate gear sets in power delivering operation, to intermediate shaft 32 which reverse rotation is in turn by way of the auxiliary gear box transmitted to output shaft 34.

The first reverse speed is obtained with clutch 104 engaged, clutch 14 energized, clutch 64 engaged, clutch 114 engaged and with clutch 12 de-energized and clutches 78, 60, 82, and 120 disengaged, such that power flows by way of clutch 14, output member 40, shaft 50, gear cluster 52, meshing gears 54 and 98, and 98 and 96, clutch 104, meshing gears 94 annd 46, gear cluster 44, meshing gears 48 and 62, clutch 64, shaft 32, meshing gears 110 and 112, clutch 114, and gear 116 to shaft 34.

A second reverse speed is subsequently obtained through the de-energization of clutch 14 and simultaneous energization of clutch 12, disengagement of clutch 64 and simultaneous engagement of clutch 78, and the continued engagement of clutches 104 and 114. As such power flows by way of clutch 12, output member 38, shaft 42, gear cluster 44, meshing gears 46 and 94, clutch 104, meshing gears 96 and 98, and 98 and 54, meshing gears 54 and 76, clutch 78, shaft 32, meshing gears 110 and 112, clutch 114, and gear 116 to shaft 34.

A third reverse speed is obtained in advancing from second reverse speed by de-energizing clutch 12 and simultaneously energizing clutch 14, disengaging clutch 78 and simultaneously engaging clutch 60, while maintaining clutches 104 and 114 engaged for the delivery of power by way of clutch 14 output member 40, shaft 50, gear cluster 52, meshing gears 54 and 98, and 98 and 96, clutch 104, meshing gears 94 and 46, and 46 and 58, clutch 60, shaft 32, meshing gears 110 and 112, clutch 114, and gear 116 to shaft 34.

Fourth reverse speed is next obtained by de-energizing clutch 14 and simultaneously energizing clutch 12, disengaging clutch 60 and simultaneously engaging clutch 82, and with the clutches 104 and 114 maintained closed. Power delivery in fourth reverse speed is had by way of clutch 12, output member 38, shaft 42, gear cluster 44, meshing gear 46 and 94, clutch 104, meshing gears 96 and 98, and 98 and 54, gear cluster 52, meshing gears 56 and 80, clutch 82, shaft 32, meshing gears 110 and 112, clutch 114, and gear 116 to shaft 34.

Reverse speeds of fifth through eighth are obtained through the employment of gear train 118 and 116 of the auxiliary gear set 26 instead of gear train 110 and 112 utilized in the case of reverse speeds one through four. In the case of reverse speeds five through eight the same gear trains are used in their respective order as for reverse speeds one through four aside from the gear trains of auxiliary gear set 26.

By alternately energizing the clutches 12 and 14 it is possible, through the provision of transmission 10 affording eight forward and reverse speeds, to effect an alternate backward and forward movement of the vehicle in which the transmission is incorporated. For example with any one of the clutches 60, 64, 78 or 82 closed and clutch 104 closed forward and reverse drive is accomplished. Rocking of the vehicle is best accomplished by using clutch 64 for both forward and reverse or by using clutch 64 for forward and clutch 60 for reverse wherein, with clutch 64 continuously engaged, an alternate energization of the clutches 12 and 14 will effect the respective forward and reverse movement of the vehicle in which transmission 10 is incorporated. In using clutch 64 for forward and clutch 60 for reverse clutch 12 is energized simultaneously with the engagement of clutch 64 and upon deenergization of clutch 12 and disengagement of clutch 64, clutch 14 is energized and clutch 60 is engaged. Similarly to the use of clutches 60 and 64, clutch 78 can be used for both forward and reverse or clutch 78 can be used for forward and clutch 82 for reverse. Inasmuch as it would require more complicated switching to use clutch 64 for forward and either clutch 78 or 82 for reverse, it is not practical to do so although actually possible.

In view of the arrangement of clutches 12 and 14 in association with the gear strains driven therefrom it is possible to effect a braking action of the transmission through the simultaneous energization of both clutches 12 and 14, such that through the engagement of either of clutches 60 or 64 and clutches 78 or 82, a counter-reaction of the clutches is had by way of shaft 32 acting to retard the rotation thereof.

The present invention also makes use of a transmission friction clutch arrangement which is disclosed and claimed in the copending application of Walter F. Double, Serial No. 442,237, filed July 9, 1954. Only sufficient disclosure of the above mentioned Double friction clutch will be supplied here, to enable one to understand the present invention, reference being had to the copending application for a more complete disclosure.

Figure 2:
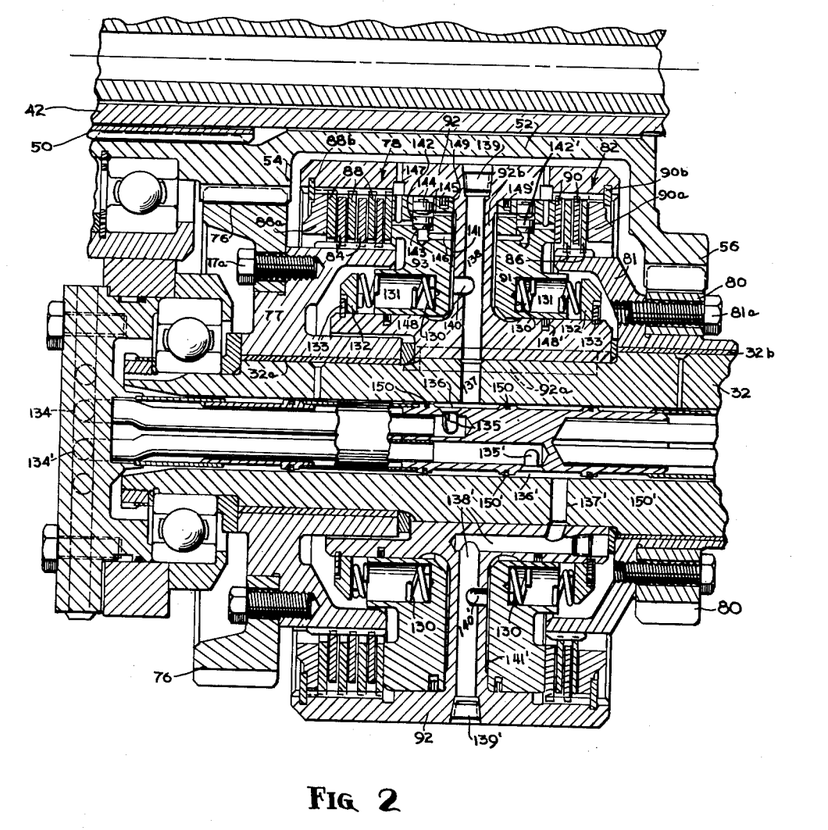
Fig. 2 is an enlarged detail view of that portion of Fig. 1 enclosed in dot-dash lines.

Fig. 2 of the present application is an enlarged sectional view through that portion of Fig. 1 enclosed in dot-dash lines. It will be understood that this discloses the details of the friction clutches 78 and 82. The friction clutches 60 and 64 are substantially identical with that which will be here described. The friction clutches 104, 114 and 120 are similar to one-half of the present disclosure of Fig. 2, namely, the equivalent of either clutch 78 or clutch 82.

Referring now to Fig. 2, the gear 76 has a hub 77 secured to it by a plurality of bolts 77a. This hub is free to rotate on intermediate shaft 32 on the plain bearing 32a. In like manner the gear 80 has a hub 81 to which the gear is secured by means of a plurality of bolts 81a. This hub is free to rotate on the shaft 32 on the plain bearing 32b. The common member 92 is keyed to shaft 32 by means of the key 92a. The common support member 92 is provided with two annular cylinders facing in opposite directions from a common central wall 92b. In one of these cylinders there is slidingly positioned an annular piston 91. In the other cylinder, facing toward the left in Fig. 2, is slidingly fitted the annular piston 93. The piston 91, when moved toward the right in Fig. 2 in clutch engaging direction, causes driving frictional engagement between the annular plates 86 which are keyed to the hub 81 and the annular plates 90 which are keyed to the common support member 92. An abutment ring 90a held in the member 92 by a snap ring 90b forms an abutment to take the thrust of piston 91. Piston 93 when it moves toward the left as viewed in Fig. 2 in clutch engaging direction, causes driving friction engagement between the set of annular plates 84 keyed to the hub 77 and another set of annular plates 88 keyed to the common support member 92. An abutment ring 88a is held in member 92 by means of snap ring 88b and serves to take the thrust from piston 93 as it moves in clutch engaging direction. A series of helical springs 130 seated in a series of cylindrical pockets 131 in pistons 91 and 93 engage against abutment rings 132 fixed relative to the member 92 by means of snap rings 133 so as to normally urge the pistons 91 and 93 in clutch disengaging direction.

Means is provided to supply pressure fluid behind the pistons 91 and 93 to urge them in clutch engaging direction while the parts are rotating. Since these arrangements are almost identical for both pistons 91 and 93, only that for piston 93 will be described in detail. Through the hollow central portion of shaft 32 there extends a pressure fluid conduit 134 which leads through radial passageway 135 to an annular port 136 which communicates with port 137 extending radially outwardly through shaft 32 and joining port 138 which is a passageway extending radially outwardly through member 92 and closed at its outer end by the plug 139. A short passageway 140 communicates between passageway 138 and the chamber 141 behind piston 93 so that pressure fluid in the chamber 141 will cause piston 93 to move toward the left as viewed in Fig. 2 against the urging of springs 130 so as to cause frictional driving engagement between the sets of plates 84 and 88.

A free poppet valve 142 is provided normally coacting with its seat 143 to hold the pressure fluid in chamber 141. This valve is freely slidable in a radially extending cylindrical opening of member 92, closed at its outer end by plug 144. Passageway 145 provides communication between chamber 141 and the radially outermost face of plug 142. Passage 146 provides fluid communication between chamber 141 and the radially innermost face of valve 142. A fluid exhaust passageway 147 leads radially outwardly through member 92 to provide free escape of liquid through passages 146 and 147 when poppet valve 142 is open, but the discharge passageway is closed when the poppet valve is in its closed position as indicated in Fig. 2. When the conduit 134 is connected to a source of pressure fluid and the pump is operating at its normal capacity, the pressures exerted on valve 142 through passages 145 and 146 hold the valve in its closed position. However, when the source of pressure fluid is cut off, then centrifugal force acting upon the poppet valve 142 will cause it to move radially outwardly to a position where it opens the passageway 147 thus allowing the pressure fluid to bleed away from chamber 141, after which springs 130 will disengage the clutch.

Parts for operating piston 91, similar to those already described for piston 93 are given the same reference characters with a prime suffix and include pressure fluid supply conduit 134' leading through shaft 32 to passageway 135' annular port 136' and passages 137', 138' and 140' to chamber 141' where the pressure fluid will cause piston 91 to move toward the right as viewed in Fig. 2 so as to engage the clutch. The poppet valve 142' serves to bleed away the pressure fluid when the source 134' is disconnected.

Seals 148 and 149 seal chamber 141 against leakage past piston 93. Seals 148' and 149' serve the same function for piston 91. Seals 150 prevent leakage from port 136 along shaft 32 and seals 150' serve the same function for the port 136'.

The present invention relates to a gear shifting device for the simple and efficient control of eight speeds forward and eight speeds reverse together with a simple arrangement whereby the vehicle may be "rocked" by shifting from any particular speed forward to the same speed reverse merely by throwing the gear shift lever from right to left as will presently appear. Reference to Fig. 4 will show the arrangement of the gear shifting notches which are arranged in a zig-zag fashion along a general fore-and-aft line from a neutral position shown at the lower portion of Fig. 4 to an eighth speed position at the upper portion of Fig. 4. It is believed that this arrangement will be more clearly understood from a study of the diagrammatic view of Fig. 3 before referring to the actual mechanical arrangements for carrying out the functions.

Figure 3:
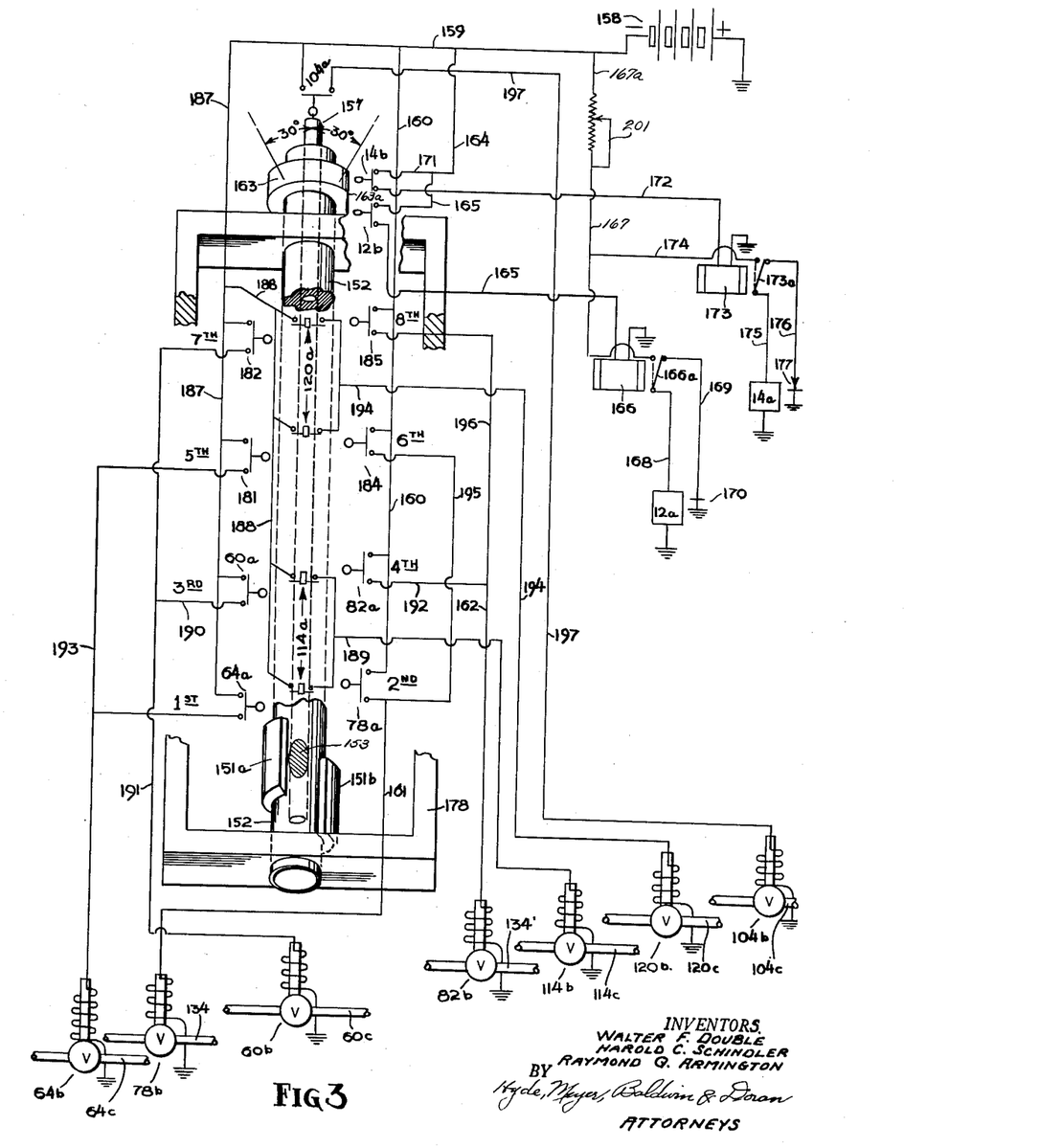
Fig. 3 is a diagrammatic view of our improved control mechanism.
Figure 4:
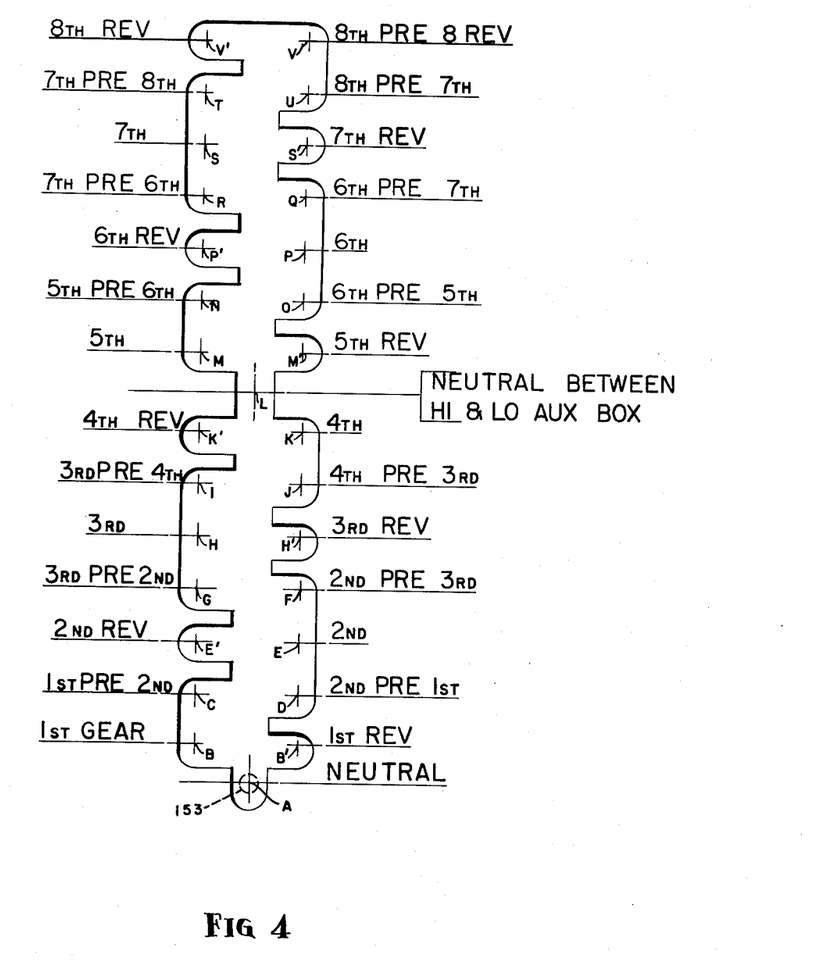
Fig. 4 is a somewhat diagrammatic layout of the control slots of a control tower adapted to operate our improved control mechanism.
Figures 5, 6, 7:
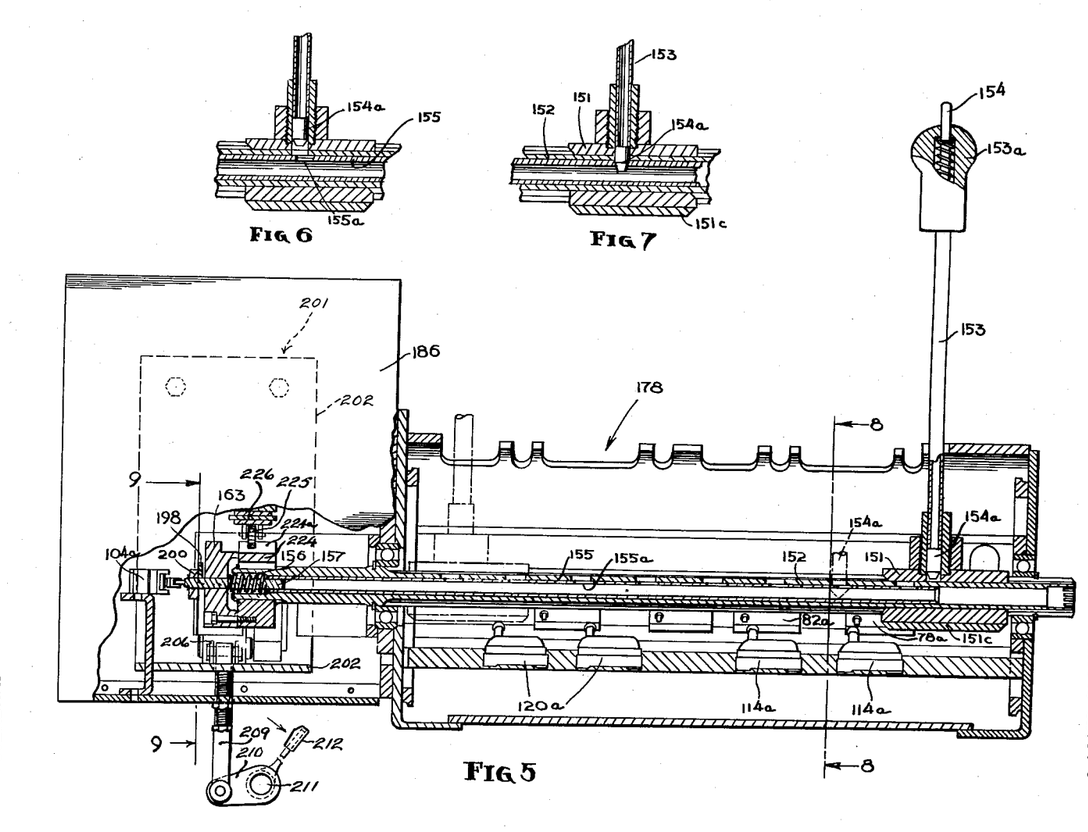
Fig. 5 is a longitudinally extending control sectional view through a control tower operating according to the diagrams of Figs. 3 and 4.
Figs. 6 and 7 are fragmental sectional views showing other positions of the mechanism seen in Fig. 5 toward the lower right-hand position thereof.
Figure 8:
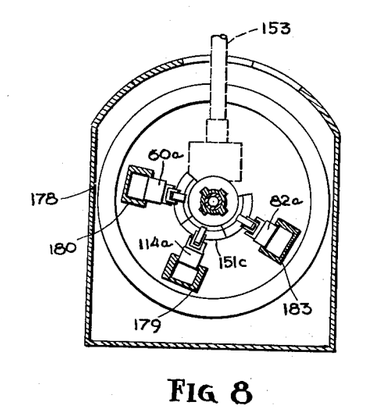
Fig. 8 is a transverse sectional view taken along the line 8—8 of Fig. 5.

Referring now to Fig. 3, a sleeve 151 bearing cams 151a and 151b is slidable along a hollow shaft 152 by means of a gear shift lever 153. If a reverse speed is to be selected, a rod 154 extending out the top of the gear shift knob 153a is depressed downwardly from the position of Figs. 5 and 6 to the position of Fig. 7 where the tapered lower end 154a of the knob enters a suitable opening 155a in a hollow central rod 155, inside of shaft 152, and the arrangement is such that the tapered end 154a cams the rod 155 toward the left as viewed in Figs. 5, 6 and 7 against the bias of spring 156 so as to cause a pin 157, rigid with rod 155 to move toward the left as viewed in Figs. 5, 6 and 7, or upwardly as viewed in Fig. 3 to cause a reverse drive as will presently appear.

In order to tie together Fig. 2 and Fig. 3, it will be noted in Fig. 3 that when the cam 151b moves upwardly it will engage the actuator for normally open switch 78a so as to close that switch and complete a circuit from electrical source 158 through lines 159 and 160, switch 78a, and line 161 to a solenoid control valve 78b, through the solenoid of that valve to the ground and thus back to the source 158. The solenoid valve 78b is normally closed and is open only when its solenoid winding is energized. This connects a source of pressure fluid connected at the left of valve 78b so that the pressure fluid flows through line 134 which is previously identified in Fig. 2 as leading to the pressure chamber 141 which actuates the clutch 78 in clutch engaging direction. Actually, the valve 78b is a double valve, the details of which are not shown, but which normally connects line 134 to drain to a common reservoir so as to insure that pressure chamber 141 does not have any pressure in it until the valve 78b is actuated as above described. In like fashion, when cam 151b is moved to engage the actuator for switch 82a, it closes this switch so as to complete a circuit from the electrical source 158 through lines 159 and 160, switch 82a, and line 162 through the solenoid winding of solenoid actuated valve 82b to ground and thence back to the electrical source. The valve 82b controls communication from a pressure fluid source not shown at the left of the valve and leading to line 134' which, as identified in Fig. 2, leads to the pressure chamber 141' so as to actuate friction clutch 82 in the clutch engaging direction as previously described. All of these valves shown across the bottom of Fig. 3, namely, 64b, 78b, 60b, 82b, 114b, 120b and 104b, all are normally closed valves insofar as fluid flow to its similarly numbered clutch is concerned and, preferably, provides a second valve which is normally open to drain the appropriate friction clutch to insure that the clutch is only engaged when the solenoid valve winding shown with the respective valves across the lower portion of Fig. 3 are energized. Referring now to Figs. 1, 2 and 3, valve 64b controls flow from a pressure fluid source through line 64c to friction clutch 64 which is similar to the friction clutches shown in Fig. 2. Valve 60b controls flow of pressure fluid from the source through line 60c to the friction clutch 60 which is actuated in the manner of the clutches of Fig. 2. Valve 114b controls pressure fluid flow from the source through line 114c to friction clutch 114 which is controlled in the fashion of clutches of Fig. 2. Valve 120b controls pressure fluid flow from the source through line 120c to friction clutch 120 which is actuated in the same manner as the clutches of Fig. 2. Valve 104b controls the flow of pressure fluid from the source through line 104c to friction clutch 104 which operates in the manner of the clutches of Fig. 2.

Figure 9:
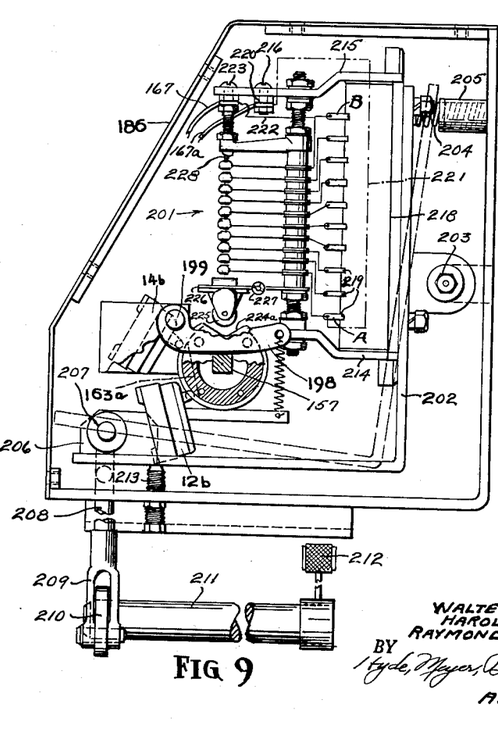
Fig. 9 is a transverse sectional view enlarged taken along the line 9—9 of Fig. 5.

Main clutches 12 and 14 are engaged only when their respective electrical windings 12a and 14a respectively are energized. Winding 12a is under the control of switch 12b (Figs. 3 and 9) and winding 14a is under the control of switch 14b. These switches are actuated by cam 163 which is fixed on the rear end of shaft 152 to oscillate 30 degrees either direction from neutral as the shaft 152 is oscillated by means of the gear shift lever 153. Referring to Figs. 3 and 9, a flat surface 163a on cam 163 is normally so located that neither of the normally open switches 12b or 14b is actuated. When lever 153 is moved toward the viewer of Fig. 5 or toward the left in Fig. 3 so as to oscillate shaft 152 in a counterclockwise direction as viewed in Fig. 3, the cam 163 actuates switch 12b which completes the circuit from source 158 through lines 159, 164 and 165, switch 12b, line 165 and relay 166 to ground and then back to the source. The normally open armature 166a of the relay is then closed and completes a circuit from the electrical source 158 through line 167a, variable resistor 201 (later described), line 167, armature 166a and line 168 to the electromagnetic clutch winding 12a and thence to ground and back to the source. This causes driving engagement between the engine driven part 30 and the clutch driven part 38 of Fig. 1. When switch 12b is opened, relay 166 is de-energized and its armature 166a returns from the broken line position of Fig. 3 to the full line position thus connecting the electromagnetic winding 12a through line 168, armature 166a, and line 169 through a discharge rectified 170 to ground. Similarly, when the shift lever 153 is moved away from the viewer in Fig. 5 or toward the right in Fig. 3, the shaft 152 is oscillated in a clockwise direction and the other side of cam 163 engages switch 14b to close it. This completes the circuit from the electrical source 158 through lines 159, 164 and 171, switch 14b, line 172 and relay 173 to ground and thence back to the source. This energization of the relay causes its armature 173a to be moved from its normal full line position of Fig. 3 to the broken line position thus completing a circuit from the source 158 through line 167a, variable resistor 201, lines 167 and 174, armature 173a in its broken line or actuated position, and line 175 through electromagnetic winding 14a to ground and thence back to the source. This electromagnetically couples the clutch 14 so as to cause driving engagement between the engine driven part 30 and the clutch driven part 40 of Fig. 1 but only while the electromagnetic winding is energized. Upon opening of switch 14b, relay 173 is de-energized, its armature returns to the full line position of Fig. 3, and a circuit is completed from the electromagnetic winding 14a through line 175, armature 173a and line 176 through the discharge rectifier 177 to ground.

Figs. 5 to 9 inclusive show the physical embodiment of some of the parts which have heretofore been explained diagrammatically. A casing 178 has bottom, side and end walls and a top cover which is slotted as shown in Fig. 4 to provide the various notches for the gear shift lever 153. The shaft 152 is oscillatably mounted in the opposed end walls of the casing 174 as clearly seen in Fig. 5. A fixed bar 179 parallel to shaft 152 carries the two switches 114a and the two switches 120a. Another bar 180 also parallel to shaft 152 carries the switches 64a and 60a already described together with switches 181 and 182 for the fifth and seventh gears as will presently appear. A third fixed bar 183, parallel to the two, carries switches 78a and 82a previously described and similar switches 184 and 185 for sixth and eighth gears as will presently appear. To the rear end of the casing 178, another casing 186 is fixed, in which are housed the switches at the rear end shaft 152.

It is believed that the operation of our improved transmission will now be understood. With the gear shift lever 153 in the position marked A in Fig. 4, which is the same position as shown for this lever in full lines in Fig. 5, everything is in neutral. As the lever is moved to position B of Fig. 4, cam 151a engages microswitch 64a and closes it. This completes an electrical circuit from the source 158 through lines 159 and 187 and switch 64a to the winding of the solenoid actuator for valve 64b, thus sending pressure fluid through line 64c to friction clutch 64 of Fig. 1 as previously described. This selects first gear but no driving action occurs until one of the main clutches is closed. The swinging of lever 153 from its central position (moving away from position A) toward the left to position B, causes cam 163 to close switch 12b so as to energize main clutch 12 as previously described. In any position of cam 151 for selecting first, second, third or fourth speeds, the cam 151c engages one or the other of the switches 114a so as to complete an electrical circuit from the source 158 through lines 159, 187 and 188, switch 114a, and line 189 to the solenoid winding for the actuator of valve 114b. This admits pressure fluid from the source not shown through line 114c leading to the friction clutch 114 in the auxiliary gear box so as to engage clutch 114 and provide the proper driving connection between shafts 32 and 34. Thus, the movement of the gear lever 153 to position B of Fig. 4 engages the necessary main clutch and auxiliary clutches for the drive in first gear.

To pre-select second gear while the transmission is still in the first gear, the gear shift lever 153 is moved from position B to position C in Fig. 4. Cam 151a still holds switch 64a closed and cam 163 still holds switch 12b closed. Cam 151b now closes switch 78a which drivingly engages friction clutch 78 as previously described. Since main clutch 14 is disengaged, the selected gears merely turn freely. To shift to second gear, the gear shift lever is moved transversely across the gear shift slot in Fig. 4 from position C to position D. This shift causes cam 163 to disengage switch 12b and to engage switch 14b so that clutch 12 is released and clutch 14 is drivingly engaged. This completes the drive for second gear through clutches 78 and 114. Cam 151a is of such arcuate extent that it still holds switch 64a closed, friction clutch 64 is engaged, and merely returning the gear shift lever from position D to position C will again place the transmission in first gear.

While still in second gear, third may be selected. The gear shift lever is moved from position D through position E to position F in Fig. 4. This movement causes cam 151a to disengage switch 64a so that it opens and disengages clutch 64. As cam 151a moves upwardly in Fig. 3 it closes switch 60a which completes a circuit from line 187 through lines 190 and 191 to energize the solenoid winding which actuates valve 60b to open it and admit pressure fluid to line 60c which in turn leads to the friction clutch 60 and actuates it in a clutch engaging direction as previously mentioned. With the gear shift lever at position F, second gear is still engaged but third gear pre-selected but not as yet operative. Shifting of lever 153 from position F to position G opens switch 14b and closes switch 12b so that the drive is now through main clutch 12, friction clutch 60 and friction clutch 114 to drive in third gear. Cam 151b is of sufficient arcuate extent that switch 78a remains closed and the operator can go back to second gear merely by switching from position G to position F.

While in third gear, the operator can pre-select fourth gear by moving the gear shift lever from position G through position H to position I. This causes cam 151b to close switch 82a which completes a circuit through line 160 and lines 192 and 162 to the solenoid winding of the actuator for valve 82b so as to admit pressure fluid through line 134' to clutch 82 as previously described. This engages clutch 82 but fourth gear is not effective until the operator shifts the lever 153 from position I to position J. This action de-energizes the electromagnetic winding for clutch 12 and energizes clutch 14 so that fourth gear is driving through main clutch 14 and friction clutches 82 and 114. Switch 60a is still energized with the lever in position J and third can again be made effective by shifting back to position I.

Fifth to eighth gears utilize the same friction clutches in the main box as gears one to four respectively but utilize clutch 120 in the auxiliary box instead of clutch 114. With this explanation, the description of fifth to eighth gears may be greatly simplified.

To engage the fifth gear forward, the operator moves the gear shift lever through positions J, K and L to position M. The position L is a neutral position between fourth and fifth gear. With the gear shift lever in position M, the cam 151a closes microswitch 181 to complete a circuit through line 187 and 193 to the solenoid winding for valve 64b which again engages clutch 64. At the same time cam 163 closes switch 12b to engage main clutch 12. At the same time the cam 151c on the lower side of the sleeve 151 has shifted upwardly in Fig. 3 until it engages one of the switches 120a. This completes a circuit through lines 187, 188 and 194 to the solenoid winding for the actuator of valve 120b. This admits pressure fluid from a source not shown through line 120c to friction clutch 120, engaging this clutch. This completes the drive in fifth gear.

Upon moving the shift lever from position M to position N, the fifth gear remains engaged but sixth gear is pre-selected by cam 151b moving to close switch 184. This completes a circuit through line 160, 195 and 161 to the solenoid actuating valve 78b so as to close clutch 78. Moving of shift lever from N to position O engages sixth gear but keeps the fifth gear pre-selected as switch 181 is still closed and the operator can move backwardly if desired.

While in sixth gear, the operator can pre-select seventh gear by moving the shift lever from position O through P to Q. This causes cam 151a to close switch 182 which completes a circuit through lines 187 and 191 to the solenoid actuator for valve 60b so as to cause engagement of clutch 60. Moving of the shift lever across from position Q to position R will then engage seventh gear while sixth gear remains pre-selected.

While in seventh gear, the operator can pre-select eighth gear by moving the shift lever from position R through S to T. This causes cam 151b to engage and close switch 185 which completes an electrical circuit through lines 160, 196 and 162 to the solenoid actuator for valve 82b which opens and causes engagement of friction clutch 82. Shifting from position T to position U disengages main clutch 12 and engages main clutch 14 for eighth gear drive.

While the transmission is driving in first gear, the operator may go into first reverse gear by simply moving the gear shift lever transversely from position B to position B', while at the same time pushing down on the rod 154 so as to cause the closure of switch 104a by the mechanism previously described. The closure of switch 104a completes a circuit through lines 159 and 197 to the solenoid winding for the actuator to open valve 104b. This admits pressure fluid through line 104c to actuate clutch 104 in closing direction. This completes a drive which is reversed through the idler gear 98 as previously described. In other words, with the gear shift lever at position B first gear forward is actuated through main clutch 12 and friction clutches 64 and 114. On the other hand, with the shift lever in position B' and switch 104a closed, reverse drive is established through main clutch 14, and friction clutches 104, 64 and 114.

In a similar fashion shifting of lever 153 from position E where second gear forward is engaged to position E' while depressing rod 154 will cause second gear reverse drive. This drive will be through main clutch 12 and friction clutches 78 and 114. Third reverse gear is selected by movement from position H to H'; fourth reverse from K to K'; fifth reverse from M to M'; sixth reverse from P to P'; seventh reverse from S to S'; and eighth reverse from V to V'. In each case reverse drive in the same gear is provided through clutch 104 while shifting between the main clutches 12 and 14. This makes it possible to "rock" the vehicle by shifting, for instance, from position B to B', or any other similar arrangement shown on Fig. 4.

Figure 10:
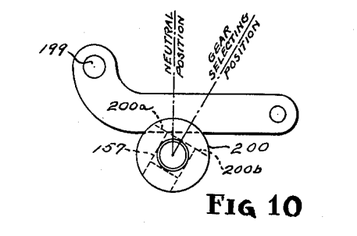
Figure 11:
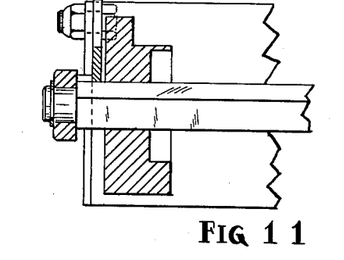
Fig. 11 is a fragmental view of the same parts similar to the left side of Fig. 5, but with the parts in the position of Fig. 10.

To permit the operator to carry out the rocking operation, or to make a quick shift from forward to reverse most efficiently, an arrangement is provided as shown in Figs. 5, 9, 10 and 11, wherein a latch or stop member 198 is pivotally mounted on the casing at 199 in position to drop on the right-hand side (Fig. 5) of a collar 200, which is fixed to the left-hand end of pin 157. The parts are shown in full lines in Fig. 5 in the position wherein the operator's lever is in the vertical position and the reverse switch engaging pin is not depressed. Latch 198 then is resting on the flats of the square end of pin 157 and of collar 200. When the operator's control lever is moved forward in line with any of the reverse speed selecting slots in the casing, the reverse pin may be depressed, moving pin 157 to the left, and closing reverse friction clutch switch 104a. Collar 200 moves leftward with pin 157 and if the operator's control lever is rocked 30 degrees into either a forward or a reverse ratio selection, the latch 198 will drop behind a corner 200a or 200b of collar 200 and hold it and pin 157 to the left, maintaining the reverse switch closed, and therefore holding the reverse friction clutch engaged. The position of the parts is shown in Figs. 10 and 11. The operator may then remove his hand from the reverse pin 154 and the reverse clutch will continue in engagement.

If the control lever is now in a forward gear ratio position, the reverse friction clutch is also preselected, and a quick shift to the same reverse speed may be made by holding the reverse pin 154 depressed, as the control lever is moved laterally to the reverse notch in the case. By having the reverse clutch preselected while driving in a forward ratio, the reverse shift can thus be made without the delay in time required to engage the reverse friction clutch.

Latch 198 will hold collar 200 and pin 157 to the left, maintaining the reverse switch 104a in the closed position, once the operator's lever 153 is in either a forward or a reverse position 30 degrees off the vertical. When the lever 153 is moved to a vertical position it will release the collar and pin allowing them to move back to the right and de-energizing the reverse switch, unless pin 154 is held in the depressed position by the operator. This mechanism thus permits operation in reverse, or in forward with reverse preselected without the need for the operator to hold the reverse pin depressed except just during the interval of shifting from forward to reverse, or vice versa. The operator can then also release the reverse clutch for making an up shift, or a down shift, merely by not holding the reverse pin depressed as the shift lever is moved to the vertical position as the shift is being made.

The variable resistor 201, best shown in Fig. 9, is necessary and desirable in those applications where very gradual engagement of the two main driving electromagnetic clutches 12 and 14 is required. This device is arranged to provide jerk-free starting of the vehicle into motion, or for inching movement of the vehicle. The device comprises a generally L-shape bracket 202 mounted on a pivot 203 fixed with respect to the casing 186 and preferably provided with a ball bearing at that point. A helical spring 204 is mounted in a cup 205 fixed on the casing 186 and bears against the vertical leg of the bracket 202 so as to maintian the same normally in the full line position of Fig. 9. The horizontal leg of the bracket 202 is provided with ears 206 to which, at 207, a clevis 208 is pivotally connected. This connects through a link 209 with a crank 210 which in turn is fixed to shaft 211. This shaft is manipulated by means of the pedal 212 located adjacent the operator's seat. The arrangement is such that if the clutch pedal 212 is depressed in the direction of the arrow of Fig. 5, the link 209, 208 is raised and pivots the bracket 202 about pivot 203 to the broken line position of Fig. 9. At this time, the spring 204 is compressed beyond its pre-loaded length. Spring 204 normally holds the horizontally extending leg of the bracket 202 against the stop screw 213.

Rigidly mounted on the vertical leg of the bracket 202 are two spaced arms 214 and 215. Rigidly mounted between the arms is a mandrel 216 provided with a plurality of leaf contacts 217 which are insulated from each other on the mandrel 216. Also carried by the bracket 202 are one or more resistances 218 provided with a series of taps 219. The taps 219 are joined by electrical connectors serially to the leaf contacts 217 in such a manner that when all of the button contacts at the outer ends of leaf contacts 217 are in engagement, the resistance 218 is entirely shunted or cut out, and as the buttons on the leaf contacts progressively disengage each other, more and more of the resistance 218 is placed in series, and when all of the leaf contacts are out of engagement, all of the resistance 218 is in series between the lines 167 and 167a which is connected in series between the electrical source 158 and the line 167 as indicated in the electrical diagram of Fig. 3. Referring to Fig. 9, if the incoming current on line 167a, connected at tap 220 travels through line 221 (diagrammatically indicated) to tap 219 marked A, with the parts in the position of Fig. 9, the path will be through the resistance 218 to the last tap marked B and then through line 222 to tap 223 and so to line 167. In this position, all of the resistance will be in series between 167a and 167. With part of the buttons of the leaf contacts 217 in engagement, the electrical path would be from tap A through the short circuited buttons of 217 to some other tap between A and B and thence through the rest of the resistance 218 to the outlet. Obviously, with all of the buttons of the contacts 217 in engagement, the electrical path will be from 221 through tap A, through all of the buttons of the contacts 217 to tap B and thus to the outlet, so as to shunt the resistance 218.

Two means are provided for causing engagement of the buttons of the leaf contacts 217. One arrangement is under control of the operator's lever 153. This comprises a cam 224 which is mounted on shaft 152 so as to oscillate with this shaft as the lever 153 is moved to the right or left from the vertical. In the upper portion of this cam is provided V-shape notch 224a which is normally vertically upward as shown in Fig. 9 when the lever 153 is in its vertical position. Movement of lever 153 to either side of the vertical causes one of the sides of cam 224a to engage a roller cam follower 225 which is rotatably mounted in a bracket 226 directly in line with the buttons of the contacts 217. The bracket 226 is pivotally mounted on a hinge 227 which is so constructed as to prevent movement of the bracket 226 any further counterclockwise than the position shown in Fig. 9, while permitting movement of bracket 226 clockwise from the position of Fig. 9. This movement of bracket 226 when it is raised by means of cam 224a will cause progressive engagement of the leaf contacts 217 starting from the bottom and moving upwardly as viewed in Fig. 9. At the upper end, a stop 228, resiliently mounted, holds the uppermost contact 217 against upward movement. The pre-loading of spring 204 is sufficient to resist the upward force tending to rotate the bracket 202 as the operator moves the control lever 153 to the right or left in some gear ratio. In other words, the bracket 202 remains in its full line position of Fig. 9 as the cam 224a causes engagement of one or all of the leaf contacts 217 during rocking of the operator's lever 153. Thus, as the lever 153 is rocked through about 30 degrees of travel on one side or the other of the vertical, selecting one or the other of the electromagnetic clutches 12 or 14, the cam 224a lifts the roller 225 decreasing the resistance 218 in series and feeding higher amperage to the selected clutch. By proper control of the operator's lever, the electric clutches can thus be made to slip to varying degrees to obtain the desired control of the vehicle movement.

Another manner of controlling the amount of resistance 218 which is in series between 167a and 167 is under the control of the clutch pedal 212. If the cam 224a has raised the roller 225 so as to rotate the bracket 226 clockwise from the position of Fig. 9 to close part or all of the leaf contacts 217, so as to cut out some or all of the resistance 218, this resistance can be gradually cut back in by depressing the clutch pedal 212. This depression of the clutch pedal causes the linkage 208, 209 to be raised so as to move the bracket 202 from its full line position of Fig. 9 toward its broken line position, this providing sufficient force to compress the spring 204 beyond its pre-loaded length. As the bracket 202 tilts in a clockwise direction about pivot 203, the leaf contacts 217 gradually separate cutting more and more resistance into the circuit and partially de-energizing one or the other of the electromagnetic clutches 12 or 14, causing it to slip and to reduce the vehicle speed. When the clutch pedal is completely depressed, the roller 225 is completely lifted off the cam 224a, even though lever 153 is approximately 30 degrees off the vertical position and in one of the gear selecting positions indicated in Fig. 4. Thus it is possible by gradually releasing the clutch pedal to slip the clutches 12 and 14 to any degree desired to provide complete control of the rate of acceleration of the vehicle.

What we claim is:

1. In a change-gear transmission for connection with a power source and having first and second main drive shafts and a third output shaft, first-speed and third-speed gear trains drivingly engageable between said first and third shafts, second-speed and fourth-speed gear trains drivingly engageable between said second and third shafts, each of said gear trains including constantly meshing gears drivingly connected through an operatively associated auxiliary clutch which is normally disengaged, means for causing engagement of each of said auxiliary clutches including first, second, third and fourth speed train control members respectively for each speed train, normally disengaged first and second main clutches for drivingly connecting said power source with said first and second drive shafts respectively, means for causing engagement of each of said main clutches including first and second main clutch control members respectively for said first and second main clutches, a control housing, a gear shifting member mounted in said housing for movement in a first direction and for movement in a second direction at an angle to said first direction, said speed train control members mounted on said housing adjacent the path of movement of said shifting member, a first operative connection between said gear shifting member and one of said speed train control members responsive to movement of said shifting member in said first direction to operate the said associated control member into auxiliary clutch engaging position, and a second operative connection between said gear shifting member and one of said main clutch control members responsive to movement of said shifting member in said second direction to operate one of said main clutch control members into main clutch engaging position.

2. The combination of claim 1 wherein said first direction movement of said shifting member is along a path extending in a generally fore-and-aft direction, said second direction movement is laterally relative to said path, said first and third speed train control members being spaced along a line generally parallel to said path on one side thereof, said second and fourth speed train control members being spaced along a line generally parallel to said path on the opposite side thereof and staggered relative to said first and third speed train control members, said first operative connection including two parts, the first part in one position along said path being adapted to engage and actuate said first speed train control member while said second part engages and actuates said second speed train control member, said first part in another position along said path being adapted to engage and actuate said third speed train control member while said second part engages and actuates either said second speed train control member or said fourth speed train control member, and said first and second main clutch control members positioned on said housing for actuated engagement by said second operative connection of said shifting member by said lateral movement in opposite directions from said path, said first main clutch control member actuated by lateral movement toward said first and third speed train control members and said second main clutch control member actuated by lateral movement toward said second and fourth speed train control members.

3. The combination of claim 2 including a reverse drive gear train drivingly engageable between said first and second main drive shafts so that each of said shafts moving in "forward" direction will drive the other of said shafts in "reverse" direction when said reverse train is drivingly engaged, said reverse train including constantly meshing gears driving connected through an operatively associated reverse clutch which is normally disengaged, and means for causing engagement of said reverse clutch including a reverse clutch control member sufficiently closely associated with said gear shifting member for operation of both by one hand of the operator, whereby, upon operation of said reverse clutch control member into reverse clutch engaging position, said shifting member may be alternated between lateral positions where said first and second main clutch control members are alternately one actuated and the other released, to "rock" a vehicle driven by said transmission.

4. The combination of claim 3, there being a gear shifting member control slot provided in said housing open continuously along said path and embracing said shifting member during its travel in a fore-and-aft direction, there being recesses on opposite sides of said slot and opening toward said slot to receive said shifting member in its lateral movement, said recesses on said first-main-clutch-control-member-actuating side being progressively from one end for (1) first speed forward; (2) first speed forward, preselect second speed forward; (3) second speed reverse; (4) third speed forward, preselect second speed forward; (5) third speed forward; (6) third speed forward, preselect fourth speed forward; and (7) fourth speed reverse; said recess (1) and (2) being in a common recess; said recesses (4), (5) and (6) being in a common recess; and said recesses on said second-main-clutch-control-member-actuating side being respectively laterally opposite the first named recesses in this order (1a) first speed reverse; (2a) second speed forward, preselect first speed forward; (3a) second speed forward; (4a) second speed forward, preselect third speed forward; (5a) third speed reverse; (6a) fourth speed forward, preselect third speed forward; (7a) fourth speed forward; said recesses (2a), (3a) and (4a) being in a common recess, and said recesses (6a) and (7a) being in common recess.

5. The combination of claim 1 including a fourth final output shaft, first and second gear ratio trains drivingly engageable between said third and fourth shafts, each of said gear ratio trains including constantly meshing gears drivingly connected through an operatively associated ratio clutch which is normally disengaged, means for causing engagement of each of said ratio clutches including first and second ratio clutch control members respectively for said first and second gear ratio trains, and a third operative connection between said gear shifting member and one of said ratio clutch control members responsive to movement of said shifting member in said first direction to operate said associated ratio clutch control member into ratio clutch engaging position.

6. The combination of claim 1 including fifth, sixth, seventh and eighth speed control members operatively connected for causing engagement of said auxiliary clutches of said first-second-third-and-fourth-speed gear trains respectively, said first direction movement of said shifting member being along a path extending in a generally fore-and-aft direction, said second direction movement being laterally relative to said path, said first, third, fifth and seventh speed control members being spaced in that order along a line generally parallel to said path on one side thereof, said second, fourth, sixth and eighth speed control members being spaced in that order along a line generally parallel to said path on the opposite side thereof and staggered relative to said first, third, fifth and seventh speed train control members, said first operative connection being adapted to simultaneously engage and actuate two successively numbered speed train control members, said first and second main clutch control members positioned on said housing for actuated engagement by said second operative connection of said shifting member by said lateral movement in opposite direction from said path, said first main clutch control member actuated by lateral movement toward said odd-numbered speed train control members and said second main clutch control member actuated by lateral movement toward said even-numbered speed train control members, a fourth final output shaft, first and second gear ratio trains drivingly engageable between said third and fourth shafts, each of said gear ratio trains including constantly meshing gears drivingly connected through an operatively associated ratio clutch which is normally disengaged, means for causing engagement of each of said ratio clutches including first and second ratio clutch control members respectively for said first and second gear ratio trains, and a third operative connection between said gear shifting member and said ratio clutch control members, said ratio clutch control members being positioned on said housing for engagement of said first ratio clutch control member by said shifting member when the latter is operatively engaged with said first, second, third and fourth speed train control members, and said second ratio clutch control member is operatively engaged by said shifting member when the latter is operatively engaged with said fifth, sixth, seventh and eighth speed control members.

7. The combination of claim 1 including a reverse drive gear train drivingly engageable between said first and second drive shafts so that each of said shafts moving in "forward" direction will drive the other of said shafts in "reverse" direction where said reverse train is drivingly engaged, there being a gear shifting member control slot embracing said shifting member and having "forward" and "reverse" selecting positions on opposite sides of said slot, means for causing engagement of said reverse drive gear train, and means responsive to movement of said shifting member to one side of said slot for maintaining said last named means in engagement-causing position.

8. The combination of claim 1 wherein said main clutches are electromagnetically engaged, an electrical circuit for controlling engagement of said main clutches and including variable resistor means, a gear shifting member control slot embracing said shifting member and having gear selecting positions of said member on opposite sides of said slot, and an operative connection between said shifting member and said variable resistor means for cutting out resistance in said circuit by movement of said shifting member to one side of said slot.

9. The combination of claim 8 including a clutch control pedal, and an operative connection between said pedal and said variable resistor for cutting in resistance in said circuit when said first named operative connection is in position for cutting out resistance in said circuit.

10. The combination of claim 1 wherein said main clutches are electromagnetically engaged, an electrical circuit for controlling engagement of said main clutches and including resistance in series in said circuit, a plurality of taps progressively arranged along said resistance, a plurality of leaf contacts, each connected respectively with one of said taps, and means responsive to movement of said gear shifting member in said second direction to cause engagement of said leaf contacts so as to shunt portions of said resistance in said circuit.

11. The combination of claim 10 including a clutch control pedal, and an operative connection between said pedal and said leaf contacts for causing disengagement of said leaf contacts out of engagement by depression of said pedal.

No references cited.